(12) United States Patent
Hsieh et al.

(10) Patent No.: US 6,665,626 B2
(45) Date of Patent: Dec. 16, 2003

(54) NETWORK-BASED COMPUTER TESTING SYSTEM

(75) Inventors: Ming-Hsiao Hsieh, Taipei (TW); Chi-Kuang Shih, Taipei (TW)

(73) Assignee: Inventec Corporation, Taipei (TW)

( * ) Notice: Subject to any disclaimer, the term of this patent is extended or adjusted under 35 U.S.C. 154(b) by 115 days.

(21) Appl. No.: 10/003,162

(22) Filed: Nov. 14, 2001

(65) Prior Publication Data

US 2003/0093238 A1 May 15, 2003

(51) Int. Cl.[7] .............................................. G01R 31/00
(52) U.S. Cl. ...................... 702/108; 455/48; 709/101
(58) Field of Search ............................ 702/108, 118, 702/57, 58, 59, 81, 84, 119, 120, 121, 188, 182, 183, 185; 709/101, 104, 201, 213, 217, 218, 226, 249; 455/418

(56) References Cited

U.S. PATENT DOCUMENTS

| | | | | |
|---|---|---|---|---|
| 5,623,498 A | * | 4/1997 | Pannone | 714/712 |
| 5,881,237 A | * | 3/1999 | Schwaller et al. | 709/224 |
| 5,966,531 A | * | 10/1999 | Skeen et al. | 709/315 |
| 5,978,911 A | * | 11/1999 | Knox et al. | 713/1 |
| 6,115,393 A | * | 9/2000 | Engel et al. | 370/469 |
| 6,125,390 A | * | 9/2000 | Touboul | 709/223 |
| 6,226,412 B1 | * | 5/2001 | Schwab | 382/232 |
| 6,292,905 B1 | * | 9/2001 | Wallach et al. | 714/4 |
| 6,308,216 B1 | * | 10/2001 | Goldszmidt et al. | 709/236 |
| 6,393,435 B1 | * | 5/2002 | Gartner et al. | 707/200 |
| 6,487,513 B1 | * | 11/2002 | Eastvold et al. | 702/108 |

* cited by examiner

*Primary Examiner*—Patrick Assouad
*Assistant Examiner*—Edward Raymond
(74) *Attorney, Agent, or Firm*—Mikio Ishimaru

(57) ABSTRACT

A network-based computer testing system performs a concurrent testing procedure on computer products for quality assurance before shipment. The testing system comprises a communication port expander, an administrator, a network system, a product database, and a file server, and is characterized in that it allows the computer products being tested to be linked to the network system by means of a standard communication interface rather than a dedicated network interface. All the required testing files and associated data files are stored in the file server, so that they can be automatically downloaded to each computer product being tested via the network system and under control by the administrator.

16 Claims, 2 Drawing Sheets

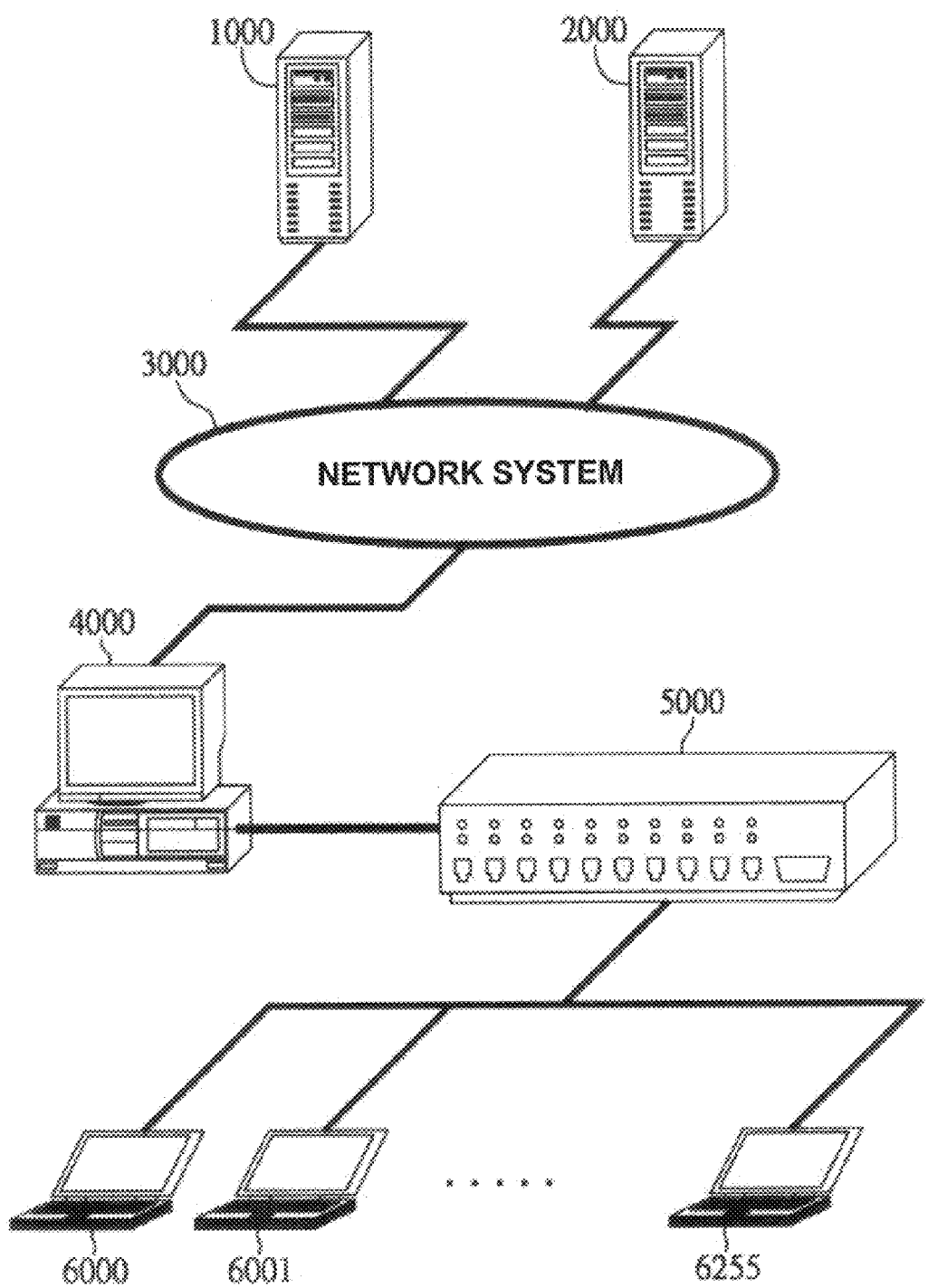

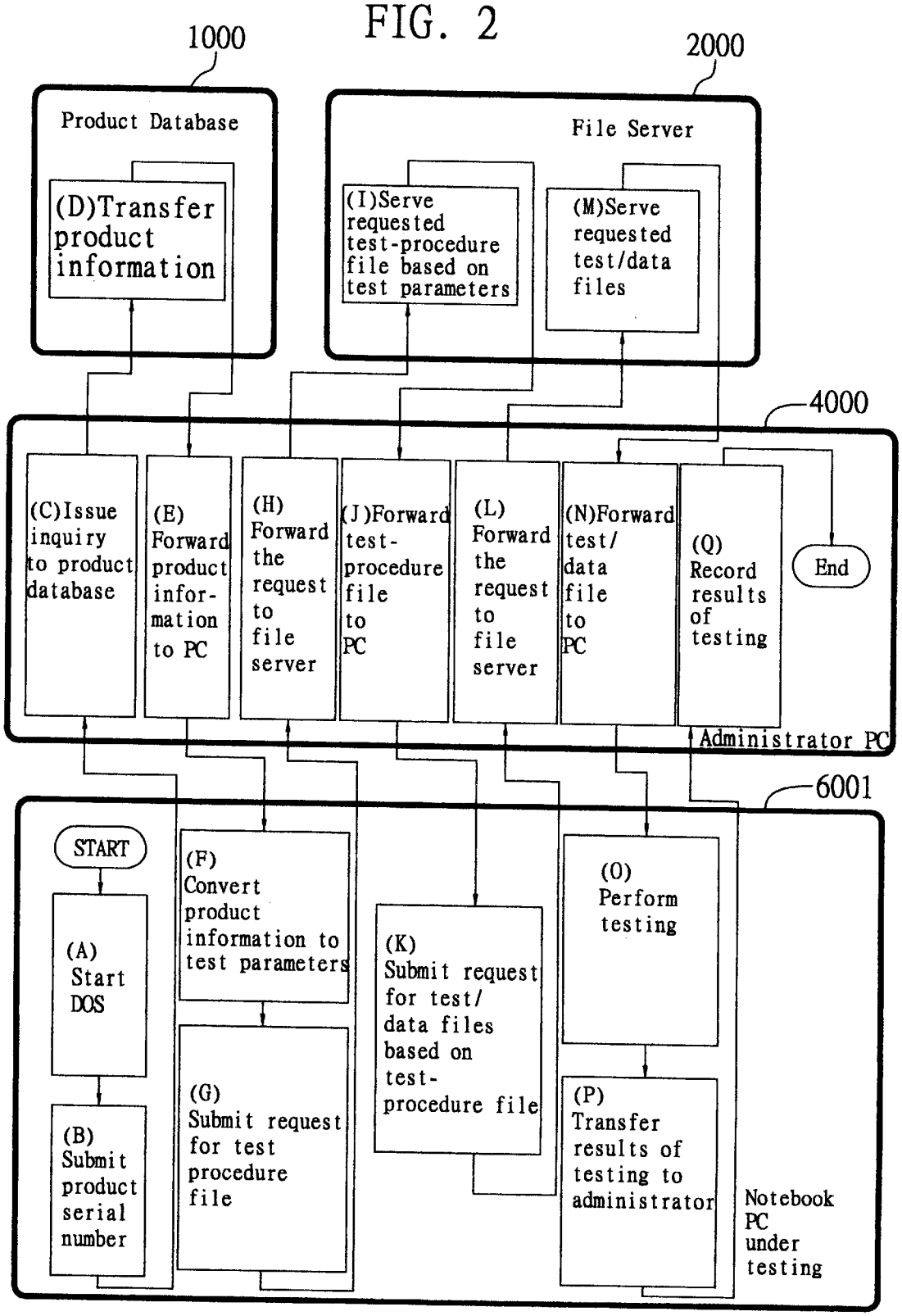

NETWORK-BASED COMPUTER TESTING SYSTEM

BACKGROUND OF THE INVENTION

1. Field of the Invention

This invention relates to computer technology, and more particularly, to a network-based computer testing system which can be used to perform a concurrent testing procedure on a batch of computer products, such as notebook computers, for quality assurance of the notebook computers before they are shipped to the market.

2. Description of Related Art

Computer products, such as notebook computers, should undergo a series of testing steps before they are shipped to the market. These testing steps include the checking of hardware/firmware/software configurations, virus scan, soft scan, and so on. Conventionally, there are two methods for implementing the testing of notebook computers.

The first method is to use floppy disks to store all the required testing files and associated data files, by which the test engineer can insert these disks one after the other to the floppy disk drive on each computer unit being tested. This method, however, has the following drawbacks.

(1) Since floppy disks are small in capacity, it requires each computer unit to be tested at a number of sites, typically 3 to 4 sites, to complete the overall testing procedure.

(2) It requires a great number of floppy disks to store the required testing files and associated data files, which would make the overall testing procedure quite inefficient and laborious to implement, particularly when copying the required disks.

(3) It requires the test engineer to select and manually insert the required disks, so that human errors might occur, which would make the overall testing procedure quite inefficient.

(4) It would be difficult to update new versions of the testing files and associated data files to the disks since copying files to disks is highly laborious and time-wasting.

(5) The use of floppy disks and the required manpower to handle these disks would make the testing procedure highly cost-ineffective and inefficient.

The second method is to use a network system to link each computer unit being tested to a file server that can download all the required testing files and associated data files to the computer unit being tested. To realize this method, however, it requires each computer unit being tested to be installed with a network card for linking to the network system. For a computer unit without a built-in network card, it then requires the coupling of an external network card to the computer unit. One drawback to the use of external network card, however, is that it would make the overall testing procedure more laborious and inconvenient to implement. Moreover, the frequent coupling and decoupling of a network card to the computer units being tested would easily wear out the card.

SUMMARY OF THE INVENTION

It is therefore an objective of this invention to provide a network-based computer testing system that can perform a concurrent testing procedure on a batch of notebook computers by linking these notebook computers to a network system through a standard communication interface, such as RS-232, USB, or IEEE-1394, rather than a dedicated network card, so that the testing procedure can be made more convenient and cost-effective, and can be completed in one pass at a single test site without having to undergo a number of test sites.

It is another objective of this invention to provide a network-based computer testing system that allows the use of only one disk for each computer unit being tested without having to use a number of disks to store all the required testing files and associated data files.

It is still another objective of this invention to provide a network-based computer testing system that allows the overall testing procedure to automatically carried out, without requiring the test engineer to select and swap required disks in and out of the computer unit being tested.

It is yet another objective of this invention to provide a network-based computer testing system that allows all the required testing files and associated data files to be centrally managed by a file server, so that they can be easily updated through the network system when needed, without having to use manpower to make updates.

It is still yet another objective of this invention to provide a network-based computer testing system that can be realized in a more cost-effective manner without having to use lots of disks and hardware devices.

It is still yet another objective of this invention to provide a network-based computer testing system that allows a batch of computer units to be tested and also allow the test results of each computer unit to be individually recorded for tracking and quality assurance.

In accordance with the foregoing and other objectives, the invention proposes a novel network-based computer testing system.

The network-based computer testing system of the invention is characterized in that it allows the computer units being tested to be linked to the network system by means of a standard communication interface, such as RS-232, USB, or IEEE-1394, rather than a dedicated network card. Moreover, all the required testing files and associated data files are stored in the file server, so that they can be conveniently downloaded to each computer unit being tested via the network system.

The network-based computer testing system of the invention comprises a communication port expander, an administrator, a network system, a product database, and a file server. In the case of prior art, the required testing files and associated data files are stored in a number of floppy disks, which requires the test engineer to laboriously swap disks in and out of the computer unit being tested; whereas in the case of the invention, these files are stored in the file server. Therefore, the network-based computer testing system of the invention allows the overall testing procedure to be implemented more cost-effectively and efficiently than the prior art.

BRIEF DESCRIPTION OF DRAWINGS

The invention can be more fully understood by reading the following detailed description of the preferred embodiments, with reference made to the accompanying drawings, wherein:

FIG. 1 is a schematic diagram showing the system architecture of the network-based computer testing system according to the invention; and FIG. 2 is a flow diagram showing the procedural steps carried out by the network-based computer testing system of the invention.

DETAILED DESCRIPTION OF PREFERRED EMBODIMENTS

The network-based computer testing system according to the invention is disclosed in full details in the following with reference to FIG. 1 and FIG. 2.

FIG. 1 is a schematic diagram showing the system architecture of the network-based computer testing system according to the invention. As shown, the network-based computer testing system according to the invention comprises a product database 1000, a file server 2000, a network system 3000, an administrator 4000, and a communication port expander 5000, and which is used to perform a concurrent testing procedure on a batch of computer units, such as notebook computers 6000–6225.

The administrator 4000 is, for example, a Windows NT based desktop PC, which is included with an expansion slot, such as a PCI slot (not shown), for connection to the communication port expander 5000. The communication port expander 5000 is provided with a number of communication ports, for example a total of 256 RS-232 port, for connection to a batch of 256 notebook computers 6000–6225 to allow the network-based computer testing system of the invention to perform a concurrent testing procedure on these notebook computers 6000–6225.

In the case of the communication port expander 5000 being USB-compliant, it allows at most 127 notebook computers to be connected thereto.

In the case of the communication port expander 5000 being IEEE-1394 compliant, it allows at most 63 notebook computers to be connected thereto.

FIG. 2 is a flow diagram showing the procedural steps carried out by the network-based computer testing system of the invention when performing a concurrent testing procedure on the notebook computers 6000–6225. Since all of these notebook computers 6000–6225 are tested in the same manner, the following description will be directed only to the notebook computer 6001.

Referring to FIG. 2 together with FIG. 1, in the step A, a startup disk is inserted into the notebook computer 6001 and then executed to start the operating system of the notebook computer 6001, such as DOS, to establish a virtual disk drive.

In the next step B, the product serial number of the notebook computer 6001 is transferred via its built-in communication port, such as RS-232, USB, or IEEE-1394, to the communication port expander 5000 and then via the communication port expander 5000 to the administrator 4000.

In the next step C, the administrator 4000 issues an inquiry in response to the product serial number of the notebook computer 6001 and then transfers it via the network system 3000 to the product database 1000.

In the next step D, the product database 1000 retrieves the product information corresponding to the received serial number of the notebook computer 6001 and transfers this information back via the network system 3000 to the administrator 4000.

In the next step E, the administrator 4000 forwards the product information back via the communication port expander 5000 to the notebook computer 6001.

In the next step F, the notebook computer 6001 converts the received product information into required test parameters.

In the next step G, the notebook computer 6001 issues an request for the required test-procedure file stored in the file server 2000 and transfers the request via the communication port expander 5000 to the administrator 4000.

In the next step H, the administrator 4000 forwards the request via the network system 3000 to the file server 2000.

In the next step I, the file server 2000 retrieves the requested test-procedure file based on the received test parameters from the notebook computer 6001. and downloads it via the network system 3000 to the administrator 4000.

In the next step J, the administrator 4000 forwards the downloaded test-procedure file via the communication port expander 5000 to the notebook computer 6001.

In the next step K, the notebook computer 6001 issues an request for the required test files and associated data files based on the received test-procedure file and transfers the request via the communication port expander 5000 to the administrator 4000.

In the next step L, the administrator 4000 forwards the received request via the network system 3000 to the file server 2000.

In the next step M, the file server 2000 retrieves the requested test files and associated data files successively and downloads these files via the network system 3000 to the administrator 4000.

In the next step N, the administrator 4000 forwards the downloaded test files and associated data files via the communication port expander 5000 to the notebook computer 6001.

In the next step O, the notebook computer 6001 executes the received test files to thereby perform a testing procedure on its internal hardware/firmware/software configurations.

In the next step P, the notebook computer 6001 transfers the results of the testing via the communication port expander 5000 to the administrator 4000.

In the final step Q, the administrator 4000 records the results of the testing on the notebook computer 6001.

During the testing procedure on the notebook computer 6001, if any piece of the internal hardware/firmware/software configuration is defective, the administrator 4000 will promptly display an error message and interrupt the testing procedure.

Compared to the prior art, the network-based computer testing system according to the invention has the following advantages.

First, the invention allows the testing of each notebook computer to be completed in one pass at one site, without having to undergo a sequence of testing procedures at different sites as in the case of the prior art, so that the invention is more efficient to implement than the prior art.

Second, the invention allows the use of only one startup disk for the testing of each notebook computer, without having to use a number of floppy disks to store the required testing files and associated data files as in the case of the prior art, so that the invention is more cost-effective and convenient to implement than the prior art.

Third, the invention allows all the testing steps to be carried out automatically, without having to involve manual operations as in the case of the prior.

Fourth, the invention allows all the required testing files and associated data files to be centrally managed by a file server, so that they can be easily updated through the network system.

Fifth, the invention utilizes a desktop PC as the administrator and an off-the-shelf communication port expander to realized, so that the invention can be implemented easily and cost-effective.

Sixth, the invention allows the linking of the notebook computers being tested to the network system to be implemented through a standard communication interface, without having to install expensive network cards, so that the invention is more cost-effective to implement than the prior art.

In conclusion, the invention provides a network-based computer testing system, which can be used to perform a concurrent testing procedure on a batch of computer units for quality assurance of the computer units before they are shipped to the market, and which is easier and more cost-effective and efficient to implement. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A network-based computer testing system for performing a concurrent testing procedure on a batch of computer units;

the network-based computer testing system comprising:
   (a) a network system;
   (b) a product database, which is linked to the network system, and which stores product information about each computer units being tested;
   (c) a file server, which is linked to the network system, and which stores all the test procedure files and testing files and associated data files that are related to the testing of each computer units being tested;
   (d) an administrator, which is linked to the network system, and which includes a network port and an expansion slot, wherein the network port is connected to the network system; and
   (e) a communication port expander, which includes a connecting port for connection to the administrator and a plurality of communication ports each being connected to one of the computer units being tested.

2. The network-based computer testing system of claim 1, wherein the expansion slot of the administrator is PCI compliant.

3. The network-based computer testing system of claim 1, wherein the expansion slot of the administrator is ISA compliant.

4. The network-based computer testing system of claim 1, wherein the communication port expander is RS-232 compliant.

5. The network-based computer testing system of claim 1, wherein the expansion slot of the administrator is USB compliant.

6. The network-based computer testing system of claim 1, wherein the communication port expander is USB compliant.

7. The network-based computer testing system of claim 1, wherein the expansion slot of the administrator is IEEE-1394 compliant.

8. The network-based computer testing system of claim 1, wherein the communication port expander is IEEE-1394 compliant.

9. A network-based computer testing system for performing a concurrent testing procedure on a batch of computer units;

the network-based computer testing system comprising:
   (a) a network system;
   (b) a product database, which is linked to the network system, and which stores product information about each computer units being tested;
   (c) a file server, which is linked to the network system, and which stores all the test procedure files and testing files and associated data files that are related to the testing of each computer units being tested;
   (d) an administrator, which is linked to the network system, and which includes a network port and an expansion slot, wherein the network port is connected to the network system;
   (e) a communication port expander, which includes a connecting port for connection to the administrator and a plurality of communication ports each being connected to one of the computer units being tested;
   (f) a set of communication programs running on the product database, the file server, and the administrator to allow them to exchange data; and
   (g) a set of administration programs running on the administrator to allow the administrator to control the communication port expander for data exchange with the computer units being tested.

10. The network-based computer testing system of claim 9, wherein the expansion slot of the administrator is PCI compliant.

11. The network-based computer testing system of claim 9, wherein the expansion slot of the administrator is ISA compliant.

12. The network-based computer testing system of claim 9, wherein the communication port expander is RS-232 compliant.

13. The network-based computer testing system of claim 9, wherein the expansion slot of the administrator is USB compliant.

14. The network-based computer testing system of claim 9, wherein the communication port expander is USB compliant.

15. The network-based computer testing system of claim 9, wherein the expansion slot of the administrator is IEEE-1394 compliant.

16. The network-based computer testing system of claim 9, wherein the communication port expander is IEEE-1394 compliant.

* * * * *